United States Patent
Uchiyama et al.

(10) Patent No.: US 11,865,794 B2
(45) Date of Patent: Jan. 9, 2024

(54) PREPREG AND METHOD FOR MANUFACTURING MOLDED PREPREG ARTICLE

(71) Applicants: ARISAWA MFG. CO., LTD., Joetsu (JP); Ikumi Uchiyama, Joetsu (JP)

(72) Inventors: Akira Uchiyama, Joetsu (JP); Hiroshi Tanaka, Joetsu (JP); Masaaki Hirai, Joetsu (JP)

(73) Assignee: ARISAWA MFG. CO., LTD., Joetsu (JP)

( * ) Notice: Subject to any disclaimer, the term of this patent is extended or adjusted under 35 U.S.C. 154(b) by 582 days.

(21) Appl. No.: 16/976,786

(22) PCT Filed: Mar. 15, 2018

(86) PCT No.: PCT/JP2018/010174
§ 371 (c)(1),
(2) Date: Aug. 31, 2020

(87) PCT Pub. No.: WO2019/167288
PCT Pub. Date: Sep. 6, 2019

(65) Prior Publication Data
US 2021/0040283 A1 Feb. 11, 2021

(30) Foreign Application Priority Data
Mar. 2, 2018 (JP) .................. 2018-037390

(51) Int. Cl.
*B29C 70/22* (2006.01)
*C08J 5/24* (2006.01)
(Continued)

(52) U.S. Cl.
CPC ............... *B29C 70/22* (2013.01); *C08J 5/243* (2021.05); *B29K 2063/00* (2013.01);
(Continued)

(58) Field of Classification Search
CPC ....... B29C 70/22; B29C 70/003; B29C 70/06; B29C 70/34; B29C 70/40; C08J 5/243;
(Continued)

(56) References Cited

FOREIGN PATENT DOCUMENTS

| JP | 2004-292594 A | 10/2004 |
| JP | 2005-281611 A | 10/2005 |

(Continued)

OTHER PUBLICATIONS

Notice of Reasons for Refusal of Japanese Application No. 2018-037390 dated Oct. 5, 2018.
(Continued)

*Primary Examiner* — Camie S Thompson
(74) *Attorney, Agent, or Firm* — Sughrue Mion, PLLC (57) ABSTRACT

The present invention provides a prepreg that has high impact resistance despite being an all-carbon-fiber FRP (CFRP), the prepreg moreover enabling a molding time to be set to five minutes or less and making it possible to reduce molding costs. This prepreg is obtained by impregnating carbon fiber with a matrix resin comprising a mixture of a thermoplastic resin, a thermosetting resin, and a curing agent, wherein: the thermoplastic resin is a phenoxy resin; the thermosetting resin is a urethane acrylate resin; the thermoplastic resin and the thermosetting resin are compounded in a mass ratio of 15:85-35:65 (thermoplastic resin/thermosetting resin); and the curing agent causes cross-linking to occur due to a radical polymerization reaction, and is formed so as to include first and second peroxides having mutually different initiation temperatures, initiation of the second peroxide starting at a temperature at which termination of the first peroxide occurs.

12 Claims, 3 Drawing Sheets

| | Example 1 Molding temperature: 165°C; molding pressure: 3 MPa | Example 2 Molding temperature: 150°C; molding pressure: 5 MPa |
|---|---|---|
| Carbon fiber cloth | Carbon fiber: 3000 filaments; 12.5 warp and 12.5 weft filaments per 25 mm; basis weight: 198 g/m² | |
| Number of layers in carbon fiber cloth prepreg | 9 | |
| Press pressure-fastening time | 3 min | 5 min |
| Glass transition temperature [°C] (according to dynamic viscoelasticity DMA) | 128 | 122 |
| Bend strength [MPa] | 1225 | 1130 |
| Bend elasticity [GPa] | 56 | 52 |
| Interlayer shear force [MPa] | 85 | 81 |
| Charpy impact value [J/cm²] | 9.9 | 9.8 |

(51) Int. Cl.
*B29K 63/00* (2006.01)
*B29K 75/00* (2006.01)

(52) U.S. Cl.
CPC ....... *B29K 2075/00* (2013.01); *C08J 2371/12* (2013.01); *C08J 2375/14* (2013.01); *C08J 2471/12* (2013.01); *C08J 2475/14* (2013.01)

(58) Field of Classification Search
CPC ............... C08J 2371/12; C08J 2374/14; C08J 2471/12; C08J 2475/14; C08J 5/249; C08J 5/04; C08J 5/042; C08J 5/10; C08J 2375/14; C08J 2471/00; B29K 2063/00; B29K 2071/00; B29K 2075/00; C08L 63/00; C08L 75/08
USPC ........................ 428/368, 298.1, 297.4, 300.1

See application file for complete search history.

(56) References Cited

FOREIGN PATENT DOCUMENTS

| | | | | |
|---|---|---|---|---|
| JP | 2008-007618 | A | 1/2008 | |
| JP | 2011-005736 | A | 1/2011 | |
| JP | 2011-225639 | A | 11/2011 | |
| JP | 4905352 | B2 * | 3/2012 | ............... C09J 7/22 |
| JP | 2012-246583 | A | 12/2012 | |
| JP | 5614280 | B2 | 10/2014 | |
| JP | 2017-527671 | A | 9/2017 | |
| JP | 6490850 | B1 | 3/2019 | |
| WO | 2016/126815 | A1 | 8/2016 | |
| WO | 2017/163899 | A1 | 9/2017 | |

OTHER PUBLICATIONS

International Search Report of PCT/JP2018/010174 dated May 29, 2018 [PCT/ISA/210].
Extended European Search Report dated Oct. 6, 2021, issued by the European Patent Office in application No. 18907559.1.

* cited by examiner

FIG.1

| | Example 1<br>Molding temperature: 165°C;<br>molding pressure: 3 MPa | Example 2<br>Molding temperature: 150°C;<br>molding pressure: 5 MPa |
|---|---|---|
| Carbon fiber cloth | Carbon fiber: 3000 filaments;<br>12.5 warp and 12.5 weft filaments per 25 mm;<br>basis weight: 198 g/m$^2$ | |
| Number of layers in carbon fiber cloth prepreg | 9 | |
| Press pressure-fastening time | 3 min | 5 min |
| Glass transition temperature [°C] (according to dynamic viscoelasticity DMA) | 128 | 122 |
| Bend strength [MPa] | 1225 | 1130 |
| Bend elasticity [GPa] | 56 | 52 |
| Interlayer shear force [MPa] | 85 | 81 |
| Charpy impact value [J/cm$^2$] | 9.9 | 9.8 |

FIG.2

| | Comparative example 1 (epoxy resin/phenoxy resin) Molding temperature: 180°C; molding pressure: 3 MPa | Comparative example 2 (epoxy resin prepreg) Molding temperature: 150°C; molding pressure: 3 MPa |
|---|---|---|
| Carbon fiber cloth | Carbon fiber: 3000 filaments; 12.5 warp and 12.5 weft filaments per 25 mm; basis weight: 198 g/m$^2$ | |
| Number of layers in carbon fiber cloth prepreg | 9 | |
| Press pressure-fastening time | 8 min | 60 min |
| Glass transition temperature [°C] (according to dynamic viscoelasticity DMA) | 106 | 131 |
| Bend strength [MPa] | 1213 | 1010 |
| Bend elasticity [GPa] | 49 | 65 |
| Interlayer shear force [MPa] | 82 | 70 |
| Charpy impact value [J/cm$^2$] | 9.7 | 6.2 |

FIG.3

PREPREG AND METHOD FOR MANUFACTURING MOLDED PREPREG ARTICLE

CROSS REFERENCE TO RELATED APPLICATIONS

This application is a National Stage of International Application No. PCT/JP2018/010174, filed Mar. 15, 2018, claiming priority to Japanese Patent Application No. 2018-037390, filed Mar. 2, 2018, the contents of all of which are incorporated herein by reference in their entirety.

TECHNICAL FIELD

The present invention relates to a prepreg and a method for manufacturing a molded prepreg article.

BACKGROUND ART

Relative to glass fiber, carbon fiber has higher strength (e.g., a tensile strength of 4.5 GPa, 1.5 times that of glass fiber (3 GPa)), higher elasticity (e.g., a tensile elastic modulus of 230 GPa, 33 times that of glass fiber (7 GPa)), and lower weight (e.g., a density of 1.8 g/cm$^3$, 70% of that of glass fiber (2.54 g/cm$^3$)). Therefore, it is said that carbon fiber reinforced plastic (CFRP) is "strong and light-weight."

However, the rate of elongation of carbon fiber is 2%, that of glass fiber is 4%, and that of epoxy resins is 4-6%.

When subjected to, e.g., a tensile force or impact force, a CFRP that has an epoxy resin as a matrix resin can break all at once near a fracture point due to the difference in rate of elongation indicated above. This is because the carbon fiber can rupture without withstanding the applied force due to the rate of elongation of the carbon fiber being no more than half that of the matrix resin.

However, when considering applications of materials as structural elements, it is preferable from the standpoint of safety for the structural elements to fracture gradually (have high fracture toughness) or to absorb impacts while also deforming, rather than fracturing all at once near the fracture point. Because the rate of elongation of glass fiber is equivalent to that of epoxy resin (matrix resin), glass fiber fractures gradually while also deforming, rather than fracturing all at once near the fracture point.

FRP molded articles in which glass fiber is hybridized with carbon fiber to compensate for impact resistance through use of this characteristic are known. However, a drawback is presented with FRPs obtained as carbon fiber/glass fiber hybrids in that, as shall be apparent, strength and elasticity are lower than with CFRP (the properties tend to be attributed more to the glass fiber).

In addition, from the standpoint of molding, CFRP that has an epoxy resin as a matrix resin requires a step for heating/curing the epoxy resin. This heating/curing step is performed in a cycle of raising, maintaining, and then lowering the temperature; e.g., after a carbon prepreg has been shaped into a desired shape, by raising the temperature of the prepreg by 3.5° C./min, maintaining the temperature at 130° C. for one hour, and then lowering the temperature by 2° C./min. In this example, the molding time exceeds two hours (a molding time of at least about one hour is required, although the speed of raising and lowering the temperature and the retention temperature/time also have an effect).

Therefore, CFRP that has an epoxy resin as the matrix resin presents the following problems from (A) a physical-properties perspective (fracturing all at once rather than withstanding a force) and (B) an industrial perspective (the molding time is long and the yield per unit time is low).

A) When subjected to a tensile force or an impact force, the CFRP breaks all at once near a fracture point.

B) Molding requires one to two hours.

Thus far, techniques for mixing a filler or a polyamide into the epoxy resin in order to solve the problem from the physical-properties perspective have been known, as indicated in Patent Documents 1-3, etc. All of these documents indicate that using an epoxy resin as a parent matrix resin and dispersing a filler or a polyamide in the parent matrix resin yields an improvement in compression characteristics and flame retardance, but the improvement in impact resistance in terms of the abovementioned criterion (A) is insufficient.

No techniques for solving the problem from the abovementioned industrial perspective (B) have yet been proposed.

For example, the conditions for curing the matrix resin as indicated in Patent Documents 1-3 are as follows.

Patent Document 1

[The temperature is retained] at 135° C. for two hours (paragraph [0073]).

Patent Document 2

The speed of raising the temperature is 0.5° C./min; [the temperature is retained] at 130° C. for one hour (paragraph [0029]).

Assuming that normal temperature is 25° C., the time for increasing temperature is (130−25)/0.5=210 minutes; thus, the total curing time is 1 hour (60 minutes)+210 minutes=270 minutes (4.5 hours).

Patent Document 3

The speed of raising the temperature from 25° C. is 1.5° C./min; [the temperature is retained] at 150° C. for three minutes (paragraph [0060]).

The time for increasing temperature is (150-25)/1.5=84 minutes, and the total curing time is 84 minutes+3 minutes=87 minutes (about 1.5 hours).

Specifically, in Patent Documents 1-3, curing the matrix resin consumes about 1.5-4.5 hours. This is because the curing (cross-linking) reaction is determined by the epoxy resin that serves as the parent matrix resin.

PRIOR-ART DOCUMENTS

Patent Documents

[Patent Document 1] Japanese Laid-open Patent Application No. 2008-7618
[Patent Document 2] Japanese Laid-open Patent Application No. 2004-292594
[Patent Document 3] Japanese Patent No. 5614280

DISCLOSURE OF THE INVENTION

Problem to be Solved by the Invention

The present invention was contrived in view of the current situation as described above, and provides: an extremely useful prepreg in which a matrix resin is configured to include a thermoplastic resin and a thermosetting resin, whereby the prepreg has high impact resistance despite being an all-carbon-fiber FRP (CFRP), the prepreg moreover being such that a urethane acrylate resin is employed as the thermosetting resin, thereby enabling a molding time to be set to five minutes or less and making it possible to reduce molding costs; and a method for manufacturing a molded prepreg article.

Means for Solving the Problem

The main points of the present invention are described below.

A first aspect of the present invention relates to a prepreg obtained by impregnating carbon fiber with a matrix resin comprising a mixture of a thermoplastic resin, a thermosetting resin, and a curing agent,
the prepreg being characterized in that:
the thermoplastic resin is a phenoxy resin;
the thermosetting resin is a urethane acrylate resin;
the thermoplastic resin and the thermosetting resin are compounded in a mass ratio of 15:85-35:65 (thermoplastic resin/thermosetting resin); and
the curing agent causes cross-linking to occur due to a radical polymerization reaction, and is formed so as to include first and second peroxides having mutually different initiation temperatures, initiation of the second peroxide starting at a temperature at which termination of the first peroxide occurs.

A second aspect of the present invention relates to the prepreg according to the first aspect, the prepreg being characterized in that the curing agent is formed so as to include first, second, and third peroxides having different one-minute half-life temperatures, the one-minute half-life temperature of the second peroxide being 20-60° C. higher than that of the first peroxide, and the one-minute half-life temperature of the third peroxide being 10-40° C. higher than that of the second peroxide.

A third aspect of the present invention relates to the prepreg according to the second aspect, the prepreg being characterized in that each of the first, second, and third peroxides is compounded in an amount of 0.5-3 parts by mass relative to 100 parts by mass of the thermosetting resin.

A fourth aspect of the present invention relates to the prepreg according to the third aspect, the prepreg being characterized in that each of the first, second, and third peroxides is compounded in the same amount in terms of parts by mass relative to 100 parts by mass of the thermosetting resin.

A fifth aspect of the present invention relates to the prepreg according to the second aspect, the prepreg being characterized in that the one-minute half-life temperature of the first peroxide is 90° C.±10° C., the one-minute half-life temperature of the second peroxide is 130° C.±10° C., and the one-minute half-life temperature of the third peroxide is 150° C.±10° C.

A sixth aspect of the present invention relates to the prepreg according to the third aspect, the prepreg being characterized in that the one-minute half-life temperature of the first peroxide is 90° C.±10° C., the one-minute half-life temperature of the second peroxide is 130° C.±10° C., and the one-minute half-life temperature of the third peroxide is 150° C.±10° C.

A seventh aspect of the present invention relates to the prepreg according to the fourth aspect, the prepreg being characterized in that the one-minute half-life temperature of the first peroxide is 90° C.±10° C., the one-minute half-life temperature of the second peroxide is 130° C.±10° C., and the one-minute half-life temperature of the third peroxide is 150° C.±10° C.

An eighth aspect of the present invention relates to a method for manufacturing a molded prepreg article, the method being characterized in that the prepreg according to the first aspects is pressed at a temperature of 150-165° C. and a pressure of 2-5 MPa for 2-5 minutes to carry out curing and molding, whereby a molded prepreg article is obtained.

A ninth aspect of the present invention relates to a method for manufacturing a molded prepreg article, the method being characterized in that the prepreg according to the second aspect is pressed at a temperature of 150-165° C. and a pressure of 2-5 MPa for 2-5 minutes to carry out curing and molding, whereby a molded prepreg article is obtained.

A tenth aspect of the present invention relates to a method for manufacturing a molded prepreg article, the method being characterized in that the prepreg according to the third aspect is pressed at a temperature of 150-165° C. and a pressure of 2-5 MPa for 2-5 minutes to carry out curing and molding, whereby a molded prepreg article is obtained.

An eleventh aspect of the present invention relates to a method for manufacturing a molded prepreg article, the method being characterized in that the prepreg according to the fourth aspect is pressed at a temperature of 150-165° C. and a pressure of 2-5 MPa for 2-5 minutes to carry out curing and molding, whereby a molded prepreg article is obtained.

An twelfth aspect of the present invention relates to a method for manufacturing a molded prepreg article, the method being characterized in that the prepreg according to the fifth aspect is pressed at a temperature of 150-165° C. and a pressure of 2-5 MPa for 2-5 minutes to carry out curing and molding, whereby a molded prepreg article is obtained.

An thirteenth aspect of the present invention relates to a method for manufacturing a molded prepreg article, the method being characterized in that the prepreg according to the sixth aspect is pressed at a temperature of 150-165° C. and a pressure of 2-5 MPa for 2-5 minutes to carry out curing and molding, whereby a molded prepreg article is obtained.

An fourteenth aspect of the present invention relates to a method for manufacturing a molded prepreg article, the method being characterized in that the prepreg according to the seventh aspect is pressed at a temperature of 150-165° C. and a pressure of 2-5 MPa for 2-5 minutes to carry out curing and molding, whereby a molded prepreg article is obtained.

Effect of the Invention

Because the present invention is configured as described above, there are provided: an extremely useful prepreg that has high impact resistance despite being an all-carbon-fiber FRP (CFRP), the prepreg moreover enabling a molding time to be set to five minutes or less and making it possible to reduce molding costs; and a method for manufacturing a molded prepreg article.

BEST MODE FOR CARRYING OUT THE INVENTION

Preferred embodiments of the present invention are briefly described below with reference to the diagrams while indicating the effects of the present invention.

A phenoxy resin and a urethane acrylate resin that constitute a matrix resin have excellent compatibility, and a thermoplastic component and a thermosetting component satisfactorily mix together (a phenoxy group reacts with a urethane bonding site due to a peroxide and becomes incorporated at the site, forming a compatible structure).

Therefore, a molded prepreg article (CFRP) that has a matrix resin in which a thermoplastic component (flexible component) and a thermosetting component (rigid component) are satisfactorily combined, and that comprises the matrix resin and carbon fiber, will have high toughness and exceptional impact resistance.

In curing and molding of the prepreg, initiation of a second peroxide starts at a temperature at which termination of a first peroxide occurs (for example, the one-minute half-life temperatures of the peroxides are set so that the initiation of the second peroxide starts at a temperature at which the termination of the first peroxide occurs). Thus, a radical polymerization reaction for cross-linking the urethane acrylate using a plurality of peroxides is continuously carried out. Specifically, the initiation of the second peroxide is promoted by reaction heat of the first peroxide, and propagation is continuously carried out, whereby curing is quickly and sufficiently performed.

Examples

1) Specific examples of the present invention are described below with reference to the diagrams.

The present example is a prepreg obtained by impregnating carbon fiber with a matrix resin comprising a mixture of a thermoplastic resin, a thermosetting resin, and a curing agent, the prepreg being such that: the thermoplastic resin is a phenoxy resin; the thermosetting resin is a urethane acrylate resin; the thermoplastic resin and the thermosetting resin are compounded in a mass ratio of 15:85-35:65 (thermoplastic resin/thermosetting resin); and the curing agent causes cross-linking to occur due to a radical polymerization reaction, and is formed so as to include first and second peroxides having mutually different initiation temperatures, such that initiation of the second peroxide starts at a temperature at which termination of the first peroxide occurs.

Specifically, the present example is a prepreg in which carbon fiber is impregnated with a matrix resin including a thermoplastic component and a thermosetting component, and the curing agent is configured as a prescribed plurality of peroxides.

A phenoxy resin is employed as the thermoplastic component, and a urethane acrylate resin is employed as the thermosetting component. A small amount of an isocyanate resin may furthermore be added to the matrix resin. Styrene also may furthermore be added.

These components are compounded in a mass ratio of 15:85-35:65 (thermoplastic resin/thermosetting resin). When the thermoplastic resin content is less than 15 mass %, no effect for improving impact resistance due to the thermoplastic component is obtained. Conversely, when the thermoplastic resin content exceeds 35 mass %, there is a possibility that the rigidity will be insufficient.

The curing agent is formed so as to include first, second, and third peroxides having different one-minute half-life temperatures, the one-minute half-life temperature of the second peroxide being 20-60° C. higher than that of the first peroxide, and the one-minute half-life temperature of the third peroxide being 10-40° C. higher than that of the second peroxide.

Specifically, the one-minute half-life temperature of the first peroxide is set to 90° C.±10° C., the one-minute half-life temperature of the second peroxide is set to 130° C.±10° C., and the one-minute half-life temperature of the third peroxide is set to 150° C.±10° C.

These temperatures may be set as appropriate, provided that the initiation of the second peroxide starts during the termination of the first peroxide, and the initiation of the third peroxide starts during the termination of the second peroxide. In the present example, the one-minute half-life temperature of the first peroxide is near 90° C., the one-minute half-life temperature of the second peroxide is near 130° C., and the one-minute half-life temperature of the third peroxide is near 150° C. Specifically, the one-minute half-life temperature of the second peroxide is about 40° C. higher than that of the first peroxide, and the one-minute half-life temperature of the third peroxide is about 20° C. higher than that of the second peroxide.

Specifically, the first peroxide is a percarbonate, the second peroxide is an alkyl perester, and the third peroxide is a peroxyketal. The present invention is not limited thereto; other peroxides may be employed. For example, the first peroxide may be configured as an alkyl perester having a one-minute half-life temperature near 90° C., the second peroxide may be configured as a diacyl peroxide having a one-minute half-life temperature near 130° C., and the third peroxide may be configured as a percarbonate having a one-minute half-life temperature near 150° C.

Employing the peroxides described above makes it possible, after the initiation of the first peroxide has occurred due to heating, to cause the initiation of the second peroxide to occur when the termination of the first peroxide occurs (before the radicals are eliminated due to the termination and the radical polymerization ends), and similarly makes it possible, after the initiation of the second peroxide has occurred, to cause the initiation of the third peroxide to occur when the termination of the second peroxide occurs.

Each of the first, second, and third peroxides is compounded in an amount of 0.5-3 parts by mass relative to 100 parts by mass of the thermosetting resin. In the present example, each of the first, second, and third peroxides is compounded in the same amount in terms of parts by mass relative to 100 parts by mass of the thermosetting resin.

These compounding amounts are determined as appropriate through, inter alia, experimentation; e.g., to confirm (radical polymerization) reactivity with respect to the product obtained by multiplying the active oxygen content of the peroxides by the number of mass parts of the peroxides, in consideration of the active oxygen content of the peroxides.

In cases where an isocyanate resin is added, 1-5 parts by mass of the isocyanate resin is compounded per 100 parts by mass of the thermosetting resin. In cases where styrene is added, 3-15 parts by mass of the styrene is compounded per 100 parts by mass of the thermosetting resin. These compounding amounts also are determined as appropriate, in the same manner as with the peroxides, according to characteristics of a molded article and experimentation pertaining to reactivity with respect to the amount of styrene.

Typical carbon fiber used in carbon fiber prepregs can be employed as the carbon fiber. Specifically, typical carbon cloth or unidirectional carbon fiber can be employed.

The resin impregnation content is set so as to reach 20-40 mass %. In the present example, the amounts of carbon fiber and matrix resin are set so that the resin impregnation content reaches 25 mass %.

A prepreg having the above configuration is pressed at a temperature of 150-165° C. and a pressure of 2-5 MPa for 2-5 minutes to carry out curing and molding, whereby a molded prepreg article (CFRP) having exceptional impact resistance can be obtained.

2) The reason for employing the above configuration in the present example is described below.

The inventors conceived of using an ester-based resin, which is a thermosetting resin, as is epoxy resin, and using reaction heat obtained in a radical reaction in order to improve the amount of time taken to cure the epoxy resin as mentioned in the Background Art section (the ester-based resin in thermosetting resins that are ordinarily used is an unsaturated polyester resin or a vinyl ester resin; both of these resins have double bonds in the molecular skeleton, and it is these double-bond portions that undergo a radical reaction and thereby produce a cross-linking reaction).

It is known that three reactions occur in a radical reaction; specifically, initiation, propagation, and termination.

Thus, the inventors believed that by using peroxides having different initiation temperatures, using a second peroxide for which the initiation starts at a temperature at which the termination of a first peroxide is thought to occur, and similarly using a third peroxide for which the initiation starts at a temperature at which the termination of the second peroxide is thought to occur, it would be possible to use reaction heat generated in the initiation and the propagation occurring due to the first peroxide to cause the initiation and the propagation of the second peroxide to occur, and to similarly use reaction heat of the second peroxide to cause the initiation and the propagation of the third peroxide to occur and cause the propagation to continue, thus greatly reducing the propagation time.

Figure 3:
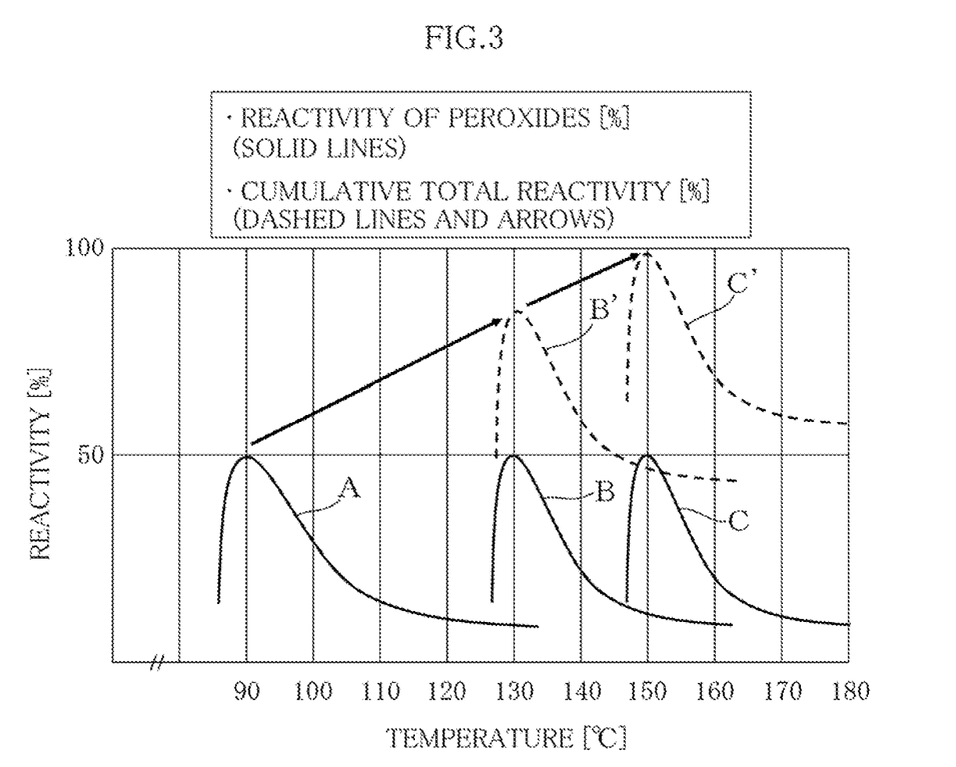
FIG. 3 is a graph illustrating the reactivity of peroxides.

The inventors performed pultrusion molding and heating/curing molding using ester-based resins (unsaturated polyester resins, vinyl ester resins) many times, and established, through this experience and experimentation, a temperature difference between the one-minute half-life temperatures of a first peroxide and a second peroxide as well as a temperature difference between the one-minute half-life temperatures of the second peroxide and a third peroxide, as described above (see peaked solid lines A, B, C in FIG. 3).

3) An overview of the radical polymerization reaction of the matrix resin in the present example is as follows.

The initiation of the first peroxide starts due to heating. Upon heating to 90° C., the radical polymerization reaction by the first peroxide advances to 50%. The radical polymerization reaction stops gradually together with the propagation, and therefore does not stop at 50% but rather advances due to, inter alia, reaction heat, e.g., from 50% to about 60% (see A in FIG. 3).

When the reactivity (A in FIG. 3) of the first peroxide has declined (when the termination is occurring), the initiation of the second peroxide starts, and radical polymerization of a not-yet-reacted portion advances to 50% at 130° C. (see B in FIG. 3). For example, when the reaction by the first peroxide has advanced to 60%, the radical polymerization reaction advances a further 20%, which is 50% of the remaining 40%; specifically, the radical polymerization reaction advances to a cumulative total of 80% (see dashed line B' in FIG. 3). Similarly to curing through the first peroxide, the radical polymerization reaction stops gradually together with the propagation, and therefore does not stop at 80% but rather advances, e.g., from a cumulative total of 80% to about 85%.

When the reactivity (B in FIG. 3) of the second peroxide has declined (when the termination is occurring), the initiation of the third peroxide starts, and radical polymerization of a not-yet-reacted portion furthermore advances to 50% at 150° C. (see C in FIG. 3). For example, when the reaction by the second peroxide has advanced to 85%, the radical polymerization reaction advances a further 7.5%, which is 50% of the remaining 15%; specifically, the radical polymerization reaction advances to a cumulative total of 92.5% (see dashed line C' in FIG. 3). Similarly to curing through the second peroxide, the radical polymerization reaction stops gradually together with the propagation, and therefore does not stop at 92.5% but rather advances, e.g., from a cumulative total of 92.5% to about 96%.

Percentages of radical polymerization are quantitatively indicated above for the purpose of description; however, in actual practice, from the amount of residual styrene in the CFRP according to the present example, the reaction advances to at least 98%, and it is considered that polymerization and curing are carried out to a level of at least 95%, at which the material presents no practical problems as a CFRP material derived from an ester-based resin (higher amounts of residual styrene after curing mean that curing is insufficient).

Although the mechanism of the chemical reaction is not yet fully understood, empirical evidence thus far suggests that, relative to compounding in which only a first peroxide and a second peroxide are added, compounding in which a third peroxide is added will yield a lower amount of residual styrene. This corroborates the fact that polymerization and curing will be achieved to a more sufficient degree in cases where the third peroxide is added than in cases where only the first and second peroxides are used (experience gained through experimentation and pultrusion-based production has been that the addition of the third peroxide actually yields excellent CFRP products).

As pertains to selection of resins, in cases involving a thermoplastic/thermosetting composite prepreg, there are situations where a polyamide resin (e.g., nylon 6) is used as the thermoplastic component. Polyamide resins do not have functional groups such as phenoxy groups (examples of functional groups includes not only hydroxyl groups such as O— and OH, but also, for example, carboxyl groups such as COO— and COOH) in the skeleton thereof, and therefore are not readily compatible with epoxy resins and urethane acrylate resins (do not readily mix therewith). In cases where a thermoplastic/thermosetting composite matrix resin is formed from an epoxy resin and a polyamide resin, distributed compounding in which polyamide resin islands are scattered through an epoxy resin sea occurs. In this case, the polyamide resin is deposited or unevenly distributed in a resin bath (in which the resin accumulates and carbon fiber passes through) of a coater in a step for coating the prepreg, and therefore a scheme for maintaining a uniform distribution, such as forced stirring of the resin bath, is necessary.

Inasmuch, compounding the resins in the present example does not require forced stirring of the resin bath because the urethane acrylate resin and the phenoxy resin are compatible. Therefore, the prepreg of the present example is regarded to be superior to that in a case where a conventional epoxy resin prepreg is manufactured in that the prepreg of the present example can be produced using a prepreg coater (through a prepreg manufacturing step).

4) Because the present example is configured as described above, the phenoxy resin and the urethane acrylate resin that constitute the matrix resin have excellent compatibility, and the thermoplastic component and the thermosetting component satisfactorily mix together (a phenoxy group reacts with a urethane bonding site due to a peroxide and becomes incorporated at the site, forming a compatible structure).

Therefore, a molded prepreg article (CFRP) that has a matrix resin in which a thermoplastic component (flexible component) and a thermosetting component (rigid component) are satisfactorily combined, and that comprises the matrix resin and carbon fiber, will have high toughness and exceptional impact resistance.

When the prepreg is cured and molded, the initiation of the second peroxide starts during the termination of the first peroxide, and the initiation of the third peroxide starts during the termination of the second peroxide, whereby the radical polymerization reaction for cross-linking the urethane acrylate resin by using a plurality of peroxides is continuously carried out. Specifically, the initiation of the second peroxide is promoted by the reaction heat of the first peroxide, the initiation of the third peroxide is promoted by the reaction heat of the second peroxide, and the propagation is continuously carried out, whereby curing is quickly and sufficiently performed.

Thus, the present example provides an extremely useful prepreg that has high impact resistance despite being an all-carbon-fiber FRP (CFRP), the prepreg moreover enabling a molding time to be set to five minutes or less and making it possible to reduce molding costs.

5) Experimental examples that support the effect of the present example are described below.

500 LM-AS (Nippon Yupika) was used as the urethane acrylate resin, and YP-50S (Nippon Steel Chemical) was used as the phenoxy resin.

In the curing agent for the urethane acrylate resin, a percarbonate having a one-minute half-life temperature near 90° C. (Perkadox 16 (Kayaku Akzo); one-minute half-life temperature: 92° C.) was used as the first peroxide, an alkyl perester having a one-minute half-life temperature near 130° C. (Kaya Ester-0 (Kayaku Akzo); one-minute half-life temperature: 133° C.) was used as the second peroxide, and a peroxyketal having a one-minute half-life temperature near 150° C. (Trigonox 22 (Kayaku Akzo); one-minute half-life temperature: 151° C.) was used as the third peroxide.

First, 30 g of the phenoxy resin is added to 100 g of the urethane acrylate resin, and the components are stirred and mixed for 5-6 hours while a temperature of 60° C. is applied by a temperature-raising stirrer (ordinarily, a parts-per-hundred ratio (PHR) in which the main agent is set to 100 is used when compounding resins, but in this instance the main agent is set to 100 g and expressed in terms of mass).

Next, the first peroxide, the second peroxide, and the third peroxide are stirred and mixed by a high-speed mixer into 130 g of the resultant mixed resin liquid of the urethane acrylate resin and the phenoxy resin, each of the peroxides being added in an amount of 1 g, and a varnish preparation (matrix resin liquid) is formed.

In cases where it is desirable for the molded article to be more rigid (for example, in cases where bend strength and bend elasticity are prioritized over impact resistance), 3 g of Baydur PUL 2500 (Sumika Covestro Urethane), which serves as an isocyanate component, may additionally be added to the varnish preparation (matrix resin liquid).

The stirred and mixed varnish preparation (matrix resin liquid) is next poured into a resin bath of a prepreg coater.

A carbon cloth is arranged on the prepreg coater (in the experimental examples, the carbon cloth comprises 3000 filaments of carbon fiber, and has 12.5 warp and 12.5 weft filaments per 25 mm, a basis weight of 198 g/m$^2$, a width of 1040 mm, and a length of 100 m). A prepreg dryer is set to a drying temperature of 110±10° C. (the temperature being adjusted according to the tackiness of the post-drying prepreg), and, at a speed of 0.5±0.2 m/min (the speed being adjusted according to the tackiness of the post-drying prepreg), the carbon cloth is successively coated with the varnish preparation (matrix resin liquid) and impregnated with the resin.

As pertains to the extent to which the carbon cloth is impregnated with the resin, the viscosity of the resin is adjusted by adding small amounts of styrene to the varnish preparation so that the amount of resin (resin impregnation content) reaches 25 mass %, which a desirable amount of resin. If the amount of styrene is high (for example, if the styrene is added in the same amount as the varnish preparation), the viscosity of the resin liquid will decrease, and although the state of impregnation into the carbon cloth will improve, the amount of resin deposited will not reach the desirable 25 mass %. The amount of resin deposited on the carbon cloth is adjusted through a balance of the viscosity of the varnish preparation and the speed of the prepreg coater (the amount of resin deposited on the carbon cloth increases as the speed increases).

After the varnish preparation that has the desirable amount of resin to be deposited has been deposited on the carbon cloth ("prepreg") by the prepreg coater, the prepreg is cut into squares measuring 300 mm per side. Nine of these squares are layered as a stack, and a release film is laminated on the upper and lower surfaces of the stack.

The nine-layer carbon cloth prepreg to which the release films have been laminated is introduced into a press that has been heated to 165° C., and a press pressure of 3 MPa is applied. Press pressure-fastening is carried out for three minutes to cure the resin deposited on the carbon cloth, and a CFRP is obtained (in a case where the prepreg is introduced into a press that has been heated to 150° C., a pressure of 5 MPa is applied, press pressure-fastening is carried out for five minutes to cure the resin deposited on the carbon cloth, and a CFRP is obtained).

Water is then introduced onto press plates for the purpose of cooling all at once to 130° C., and the CFRP is removed from the press. The CFRP that was pressed for three minutes at a temperature of 165° C. and a pressure of 3 MPa is experimental example 1, and the CFRP that was pressed for five minutes at a temperature of 150° C. and a pressure of 5 MPa is experimental example 2.

The glass transition temperature, the bend strength, the bend elasticity, the interlayer shear force, and the Charpy impact value of the resultant molded article (flat sheet comprising nine layers of the carbon prepreg measuring 300 mm per side) are measured.

Figure 1:
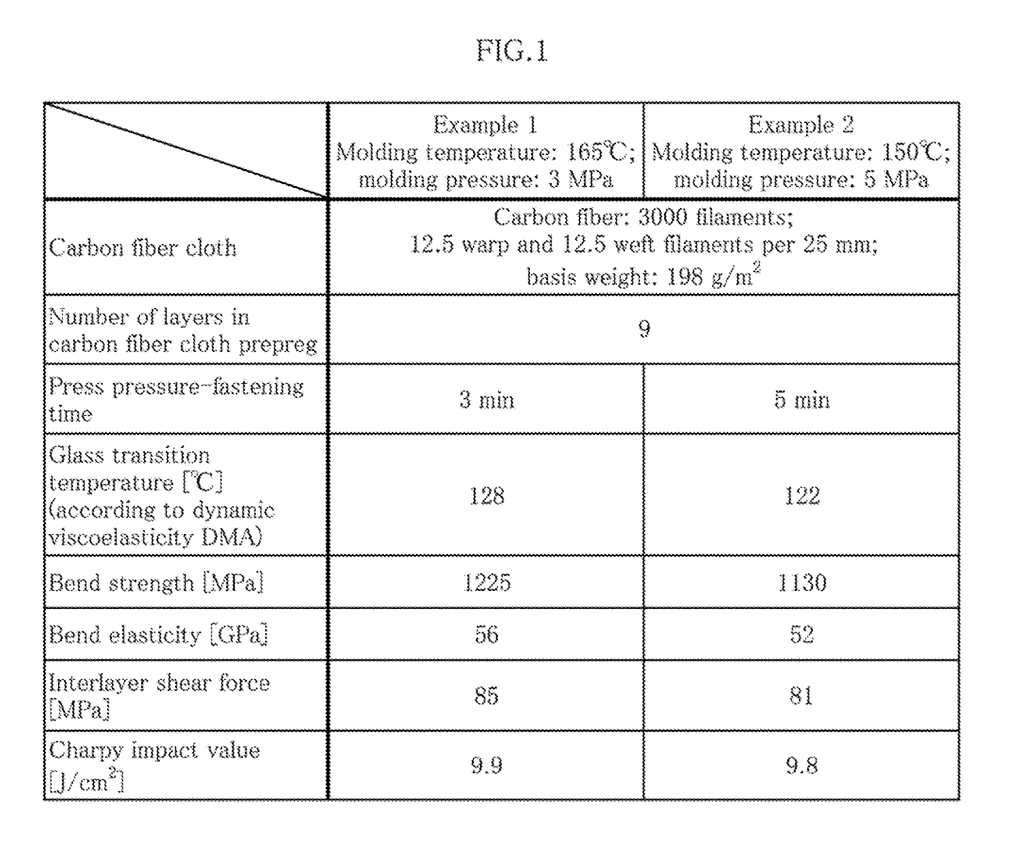
FIG. 1 is a table showing experimental conditions and experimental results for experimental examples.
Figure 2:
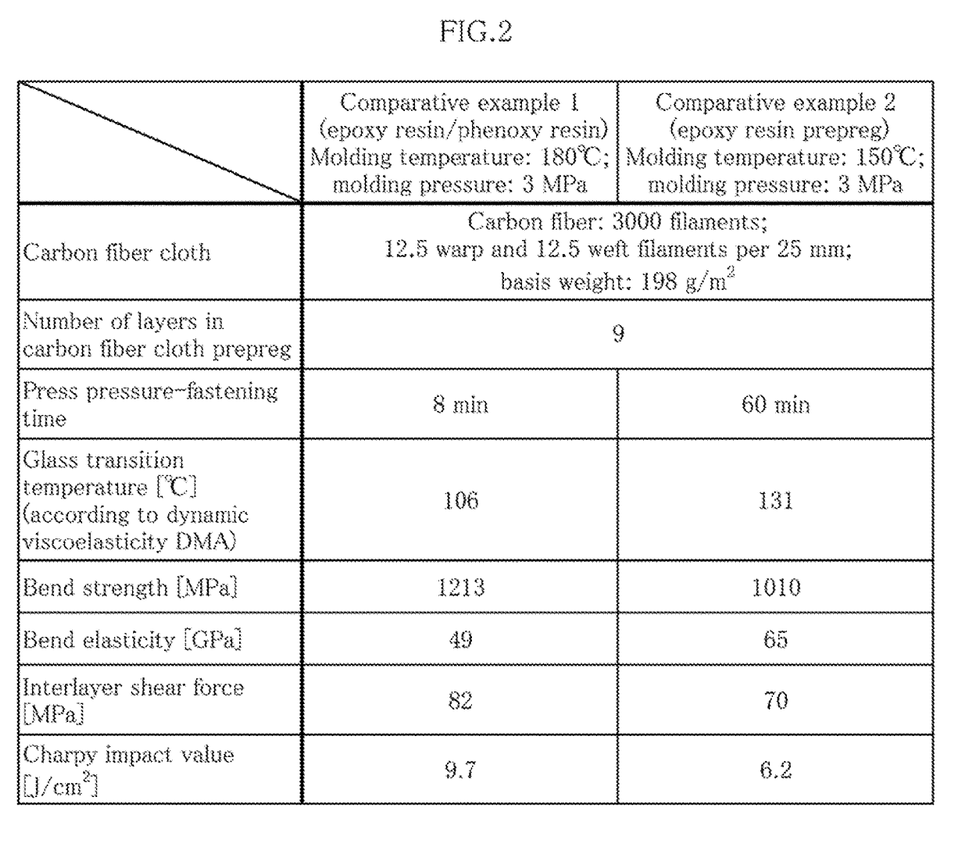
FIG. 2 is a table showing experimental conditions and experimental results for comparative examples.

The measurement results from experimental examples 1 and 2 are shown in FIG. 1. Measurement results from comparative example 1, which comprises a CFRP that is a molded article of a prepreg (epoxy resin/phenoxy resin prepreg) in which carbon fiber is impregnated with a matrix resin in which a phenoxy resin is employed as a thermoplastic resin and an epoxy resin is employed as a thermosetting resin, and from comparative example 2, which comprises a CFRP that is a molded article of a prepreg (epoxy resin prepreg) in which carbon fiber is impregnated with a (100% epoxy resin) matrix resin that does not include a thermoplastic resin, are shown in FIG. 2. The same carbon cloth as in experimental examples 1 and 2 is used in comparative examples 1 and 2 as well.

The molded article of the epoxy resin/phenoxy resin prepreg (comparative example 1) undergoes press pressure-fastening at a temperature of 180° C. and a pressure of 3 MPa for eight minutes, and the molded article of the epoxy resin prepreg (comparative example 2) undergoes press pressure-fastening at a temperature of 150° C. and a pressure of 3 MPa for 60 minutes, to cure the resin.

Comparing comparative example 2 and experimental examples 1 and 2 according to the present example shows that the press pressure-fastening time in comparative example 2, which is 60 minutes, requires 12-20 times the molding time of that in experimental examples 1 and 2, which is three minutes or five minutes. In this case, the yield per unit time does not rise, and the production efficiency is poor. Whereas the bend strength in comparative example 2 is 1010 MPa, that in experimental example 1 is 1225 MPa, which is 21% higher. Whereas the bend elasticity in comparative example 2 is 60 GPa, that in experimental example 1 is 56 GPa, which is 14% less. Whereas the interlayer shear viscosity in comparative example 2 is 70 MPa, that in experimental example 1 is 85 MPa, which is 21% higher. Whereas the Charpy impact test value in comparative example 2 is 6.2 J/cm$^2$, that in experimental example 1 is 9.9 J/cm$^2$, which is 60% higher. The impact resistance in experimental example 1 has a higher value than that in comparative example 2. Accordingly, it is indicated that experimental example 1 has extremely high impact resistance.

Comparing comparative example 1 and experimental examples 1 and 2 shows that the press pressure-fastening time in comparative example 1, which is 8 minutes, requires 1.5-2.5 times the molding time of that in experimental examples 1 and 2, which is three minutes or five minutes. In comparative example 1, a prepreg was used in which the curing agent for the epoxy resin is designed so that the storage service life of the prepreg at normal temperature (23° C.±2° C.) reaches two weeks from a practical standpoint. In comparative example 1, the press pressure-fastening time can be set to about five minutes if the amount of the curing agent for the epoxy resin is raised, but in this case, the storage service life of the prepreg is one to two days, which is not suitable for actual production. However, the storage service life in experimental examples 1 and 2 is one month or longer at normal temperature. A radical reaction (dramatically) occurs upon heating in the compounding in experimental examples 1 and 2. The prepregs in experimental examples 1 and 2 have a characteristic in which the radical reaction occurs near 90° C., which is the one-minute half-life temperature of the first peroxide, and the reaction does not readily occur at normal temperature, making it possible to extend the storage service life.

In the comparison of comparative example 1 and experimental example 1, it is revealed that: the bend strength in comparative example 1 is 1213 MPa, substantially equivalent to that in experimental example 1, which is 1225 MPa; whereas the bend elasticity in comparative example 1 is 49 GPa, that in comparative example 1 is 56 GPa, which is 14% higher; whereas the interlayer shear force in comparative example 1 is 82 MPa, that in experimental example 1 is 85 MPa, which is 4% higher; and the Charpy impact test value in comparative example 1 is 9.7 J/cm$^2$, substantially equivalent to that in experimental example 1, which is 9.9 J/cm$^2$.

However, the glass transition temperature in comparative example 1 is 106° C.; this is less than the glass transition temperature of the prepreg obtained from the 100% epoxy resin in comparative example 2, which is 131° C., and is also less than the glass transition temperatures in experimental examples 1 and 2, which are 128° C. and 122° C., respectively. The glass transition temperature is one gauge of the extent of curing, and comparative example 1 yields a result in which the glass transition temperature is at least 20° C. lower than that of the prepreg obtained from the 100% epoxy resin in comparative example 2, which is 131° C. A low glass transition temperature means that the number of cross-linking points is low, and a low number of cross-linking points indicates that curing of the epoxy resin is insufficient. It is thought that this is because curing of the epoxy resin is hindered by the phenoxy resin. The compatibility of the phenoxy resin with the epoxy resin (closeness of the epoxy resin and the phenoxy resin) is excellent because the bisphenol skeleton of the epoxy resin and the phenoxy group skeleton of the phenoxy resin are similar, and because the phenoxy groups have hydroxyl groups. However, a phenoxy resin is, so to speak, a type of alcohol having hydroxyl groups, and an alcohol component is used in order to slow curing (e.g., amine curing) of the epoxy or to achieve flexibility due to curing being insufficient. Specifically, it is considered that the same phenomenon occurs as when the glass transition temperature of the reactive-diluent epoxy resin in which the alcohol component is incorporated into the epoxy resin does not rise.

In comparative example 1, the glass transition temperature does not rise to that of the epoxy resin simplex, and a CFRP having lower elasticity than that in comparative example 2 is obtained. The CFRP also has lower elasticity than in experimental examples 1 and 2. Therefore, it can be said that comparative example 1 has inferior impact resistance with respect to experimental examples 1 and 2.

The invention claimed is:

1. A prepreg obtained by impregnating carbon fiber with a matrix resin comprising a mixture of a thermoplastic resin, a thermosetting resin, and a curing agent,
   wherein the prepreg is characterized in that:
   the thermoplastic resin is a phenoxy resin;
   the thermosetting resin is a urethane acrylate resin;
   the thermoplastic resin and the thermosetting resin are compounded in a mass ratio of 15:85-35:65 (thermoplastic resin/thermosetting resin);
   the carbon fiber is a carbon cloth or a unidirectional fiber; and
   the curing agent is formed so as to include a first peroxide, a second peroxide, and a third peroxide having different one-minute half-life temperatures, the one-minute half-life temperature of the second peroxide being 20-60° C. higher than that of the first peroxide, and the one-minute half-life temperature of the third peroxide being 10-40° C. higher than that of the second peroxide.

2. The prepreg according to claim 1, characterized in that each of the first peroxide, the second peroxide, and the third peroxide is compounded in an amount of 0.5-3 parts by mass relative to 100 parts by mass of the thermosetting resin.

3. The prepreg according to claim 2, characterized in that each of the first peroxide, the second peroxide, and the third peroxide is compounded in the same amount in terms of parts by mass relative to 100 parts by mass of the thermosetting resin.

4. The prepreg according to claim 3, characterized in that the one-minute half-life temperature of the first peroxide is 90° C.±10° C., the one-minute half-life temperature of the second peroxide is 130° C.±10° C., and the one-minute half-life temperature of the third peroxide is 150° C.±10° C.

5. A method for manufacturing a molded prepreg article, the method being characterized in that the prepreg according to claim 4 is pressed at a temperature of 150-165° C. and a pressure of 2-5 MPa for 2-5 minutes to carry out curing and molding, whereby a molded prepreg article is obtained.

6. The method for manufacturing a molded prepreg article, the method being characterized in that the prepreg according to claim 3 is pressed at a temperature of 150-165°

C. and a pressure of 2-5 MPa for 2-5 minutes to carry out curing and molding, whereby a molded prepreg article is obtained.

7. The prepreg according to claim 2, characterized in that the one-minute half-life temperature of the first peroxide is 90° C.±10° C., the one-minute half-life temperature of the second peroxide is 130° C.±10° C., and the one-minute half-life temperature of the third peroxide is 150° C.±10° C.

8. A method for manufacturing a molded prepreg article, the method being characterized in that the prepreg according to claim 7 is pressed at a temperature of 150-165° C. and a pressure of 2-5 MPa for 2-5 minutes to carry out curing and molding, whereby a molded prepreg article is obtained.

9. The method for manufacturing a molded prepreg article, the method being characterized in that the prepreg according to claim 2 is pressed at a temperature of 150-165° C. and a pressure of 2-5 MPa for 2-5 minutes to carry out curing and molding, whereby a molded prepreg article is obtained.

10. The prepreg according to claim 1, characterized in that the one-minute half-life temperature of the first peroxide is 90° C.±10° C., the one-minute half-life temperature of the second peroxide is 130° C.±10° C., and the one-minute half-life temperature of the third peroxide is 150° C.±10° C.

11. A method for manufacturing a molded prepreg article, the method being characterized in that the prepreg according to claim 10 is pressed at a temperature of 150-165° C. and a pressure of 2-5 MPa for 2-5 minutes to carry out curing and molding, whereby a molded prepreg article is obtained.

12. A method for manufacturing a molded prepreg article, the method being characterized in that the prepreg according to claim 1 is pressed at a temperature of 150-165° C. and a pressure of 2-5 MPa for 2-5 minutes to carry out curing and molding, whereby a molded prepreg article is obtained.

\* \* \* \* \*

UNITED STATES PATENT AND TRADEMARK OFFICE
CERTIFICATE OF CORRECTION

| | |
|---|---|
| PATENT NO. | : 11,865,794 B2 |
| APPLICATION NO. | : 16/976786 |
| DATED | : January 9, 2024 |
| INVENTOR(S) | : Uchiyama et al. |

It is certified that error appears in the above-identified patent and that said Letters Patent is hereby corrected as shown below:

On the Title Page

Item (71) Applicants; Line 2, Please delete "Ikumi Uchiyama, Joetsu (JP)"

Signed and Sealed this
Second Day of April, 2024

Katherine Kelly Vidal
*Director of the United States Patent and Trademark Office*